United States Patent
Totsuka et al.

(10) Patent No.: US 12,494,503 B2
(45) Date of Patent: Dec. 9, 2025

(54) METHOD FOR PRODUCING SOLID ELECTROLYTE

(71) Applicant: IDEMITSU KOSAN CO., LTD., Tokyo (JP)

(72) Inventors: Shota Totsuka, Sodegaura (JP); Atsushi Sato, Sodegaura (JP); Hironari Kimpara, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 816 days.

(21) Appl. No.: 17/632,518

(22) PCT Filed: Aug. 6, 2020

(86) PCT No.: PCT/JP2020/030148
§ 371 (c)(1),
(2) Date: Feb. 3, 2022

(87) PCT Pub. No.: WO2021/029315
PCT Pub. Date: Feb. 18, 2021

(65) Prior Publication Data
US 2022/0285724 A1    Sep. 8, 2022

(30) Foreign Application Priority Data

Aug. 9, 2019    (JP) ................. 2019-147732

(51) Int. Cl.
*H01M 10/0562*    (2010.01)
*C01B 25/14*    (2006.01)

(52) U.S. Cl.
CPC ......... *H01M 10/0562* (2013.01); *C01B 25/14* (2013.01); *C01P 2002/30* (2013.01);
(Continued)

(58) Field of Classification Search
CPC ..... H01M 10/0562; H01M 2300/0065; H01M 2300/0068; H01M 2300/0091
See application file for complete search history.

(56) References Cited

U.S. PATENT DOCUMENTS

2009/0229700 A1*   9/2009   Kanamura .......... H01M 10/058
                                                                141/1.1
2010/0009257 A1*   1/2010   Kang .................... H01M 4/62
                                                                429/209
(Continued)

FOREIGN PATENT DOCUMENTS

CN    108780682 A    11/2018
EP    2099087 A1 *   9/2009 .......... H01M 4/0407
(Continued)

OTHER PUBLICATIONS

English translation of the International Preliminary Report on Patentability and Written Opinion issued Feb. 17, 2022 in PCT/JP2020/030148.
(Continued)

*Primary Examiner* — Jeremiah R Smith
(74) *Attorney, Agent, or Firm* — Element IP, PLC

(57) ABSTRACT

A method for producing a solid electrolyte, which comprises: a step of mixing an anionic surfactant which is a monomer or an oligomer, a solvent, and a sulfide solid electrolyte to obtain a mixture; and a step of removing the solvent from the mixture.

19 Claims, 2 Drawing Sheets

(52) U.S. Cl.
CPC ............... *H01M 2300/0065* (2013.01); *H01M 2300/0068* (2013.01); *H01M 2300/0091* (2013.01)

(56) References Cited

U.S. PATENT DOCUMENTS

| | | | |
|---|---|---|---|
| 2017/0133712 A1* | 5/2017 | Mimura | H01M 10/0562 |
| 2017/0187063 A1* | 6/2017 | Pistorino | H01M 10/056 |
| 2019/0198917 A1* | 6/2019 | Seong | C01B 25/14 |
| 2019/0198918 A1* | 6/2019 | Yamamoto | H01M 10/0562 |
| 2020/0358132 A1* | 11/2020 | Yamada | H01B 1/10 |
| 2021/0167389 A1* | 6/2021 | Maeda | H01M 10/0562 |

FOREIGN PATENT DOCUMENTS

| | | |
|---|---|---|
| JP | H04-308671 A | 10/1992 |
| JP | 2008004459 A | 1/2008 |
| JP | 2015032528 A | 2/2015 |
| JP | 2017147173 A | 8/2017 |
| JP | 2019029074 A | 2/2019 |
| WO | WO-2019078307 A1 | 4/2019 |
| WO | WO-2019116964 A1 | 6/2019 |

OTHER PUBLICATIONS

International Search Report issued Sep. 8, 2020 in PCT/JP2020/030148.
Combined Chinese Office Action and Search Report issued Mar. 7, 2025, in corresponding Chinese Patent Application No. 202080004453.5, 10 pages.

* cited by examiner

METHOD FOR PRODUCING SOLID ELECTROLYTE

TECHNICAL FIELD

The invention relates to a method for producing a solid electrolyte.

BACKGROUND ART

A sulfide solid electrolyte is known to be degraded due to airborne moisture. On the other hand, for example, Patent Document 1 discloses coating a powder of a sulfide solid electrolyte with a water-repellent coating such as a fluorine resin.

Patent Document 2 discloses that an electrolyte layer is thinned and the interfacial resistance between the electrolyte layer and an electrode agent is reduced by pulverizing a solid electrolyte.

RELATED ART DOCUMENTS

Patent Documents

[Patent Document 1] JP-A-2015-32528
[Patent Document 2] JP-A-2008-4459

SUMMARY OF THE INVENTION

Although the method of Patent Document 1 is effective in suppressing generation of hydrogen sulfide, the method has problems such as poor electrochemical characteristics such as an ionic conductivity, coarsening of a particle diameter, and the like.

In addition, the inventors have found a new problem for the pulverized solid electrolyte as disclosed in Patent Document 2, where the particle diameter increases with generation of hydrogen sulfide. The particle diameter of the solid electrolyte has a significant impact on batteries using the solid electrolyte (e.g., all-solid lithium ion battery). For example, coarsening of solid electrolyte particles during the production and use of batteries causes short-circuiting. In addition, the production of the battery itself may not be possible in some cases. For this reason, the particle diameter may be more important than the ionic conductivity.

It is an object of the invention to produce a sulfide solid electrolyte in which generation of hydrogen sulfide and coarsening of the particle diameter are suppressed.

According to one embodiment of the invention, a method for producing a solid electrolyte, which comprises: a step of mixing an anionic surfactant which is a monomer or an oligomer, a solvent, and a sulfide solid electrolyte to obtain a mixture; and a step of removing the solvent from the mixture is provided.

According to one embodiment of the invention, it is possible to provide a method for producing a sulfide solid electrolyte in which generation of hydrogen sulfide and coarsening of the particle diameter are suppressed. Further, it is possible to provide a method for producing capable of reducing oil absorption of the sulfide solid electrolyte and improving productivity.

MODE FOR CARRYING OUT THE INVENTION

Figure 1:
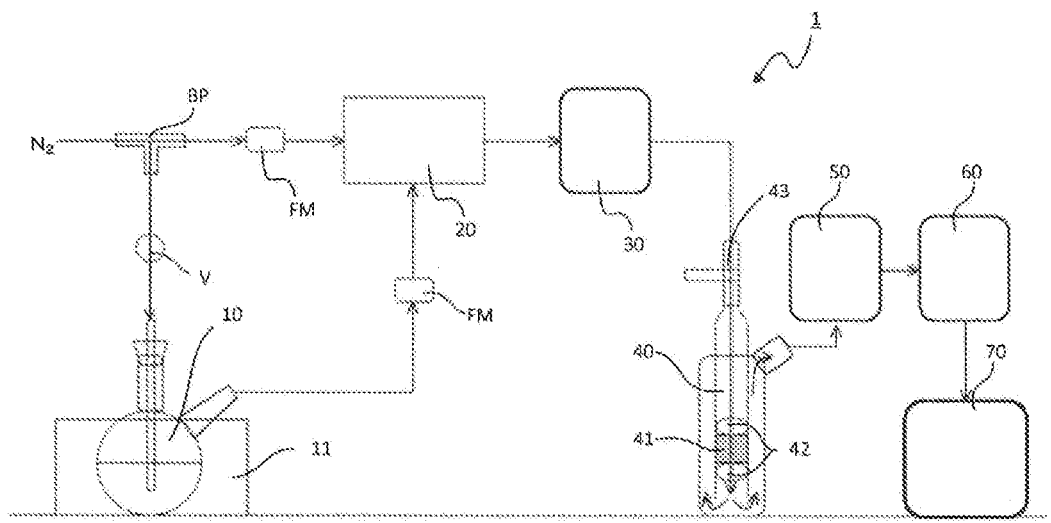
FIG. 1 is a schematic configuration diagram of a test apparatus for measuring the amount of hydrogen sulfide generated.

A method for producing a solid electrolyte according to one embodiment contains: a step of mixing an anionic surfactant which is a monomer or an oligomer, a solvent, and a sulfide solid electrolyte to obtain a mixture; and a step of removing the solvent from the mixture.

As the surfactant used in the embodiment, a monomer or an oligomer can be used. The molecular weight of the monomer and the oligomer is preferably 10000 or less, more preferably 1000 or less. By using a monomer and an oligomer of such a molecular weight, generation of hydrogen sulfide of the solid electrolyte and the coarsening of the particle diameter can be suppressed without causing a defect in electrochemical characteristics such as ionic conductivity.

In the application, an oligomer means a polymer having 2 to 20, or 2 to 10 molecules of the same kind (monomers).

An anionic surfactant is used as the surfactant of the embodiment.

Examples of the anionic surfactant include a carboxylate, a sulfonate, a sulfate ester, and the like. Specific examples thereof include sodium alkylbenzene sulfonates such as sodium dodecylbenzene sulfonate and sodium octylbenzene sulfonate; sulfosuccinate esters such as di(2-ethylhexyl) sulfosuccinate ester; and the like. Among these, a sulfosuccinate ester is preferable. Since the sulfosuccinate ester is highly lipophilic, the surface of the sulfide solid electrolyte can be wet the surface with relatively small amounts of a solvent by coating with the sulfosuccinate ester. This facilitates slurrying of the sulfide solid electrolyte, thereby improving productivity.

In one embodiment, a surfactant has one or more alkyl groups including 5 or more carbon atoms, and the total carbon atoms of the alkyl groups possessed by one surfactant molecule is 5 or more and 20 or less. Thus, water resistance is improved by hydrophobization, and solubility in a solvent is suitable and coating is facilitated.

In addition, the number of terminals of alkyl groups in the surfactant is 1 or more and 8 or less. When the number of terminals of alkyl groups is within the above range, water resistance is improved by hydrophobization, and solubility in a solvent is suitable and coating is facilitated.

The number of terminals of alkyl groups is 1 in linear alkyl group, and 2 or more in branched alkyl group; and means the sum of the number of terminals of alkyl groups possessed by one surfactant molecule.

For example, since di(2-ethylhexyl)sulfosuccinate ester has two 2-ethylhexyl groups in one molecule and the number of terminals of one 2-ethylhexyl group is 2, the number of terminals of alkyl groups in the surfactant is 4.

Commercially available surfactants can be used. Examples thereof include Neocol (registered trademark) SW-C (manufactured by DKS Co. Ltd.) and Cation G50 (manufactured by Sanyo Chemical Industries, Ltd.).

Since moisture is adsorbed, it is preferable that the surfactant do not have a hydroxyl group.

The surfactant may be commercially available as a solution containing the surfactant. In this case, it is preferable that a step of dehydrating a solution containing the surfactant be provided, and that the dehydrated surfactant and the solvent be mixed.

For example, a solution containing the surfactant may contain a polar solvent. Examples of the polar solvent include water and alcohols (isopropyl alcohol, methanol, ethanol, and the like). A sulfide solid electrolyte decomposes by water to generate hydrogen sulfide. Therefore, it is required that the surfactant does not contain water.

Dehydration can be carried out, for example, by heating a solution containing the surfactant at 60 to 200° C., and evaporating the moisture. The treatment time is about 0.5 to 8 hours. Note that other solvents (such as alcohol) may be removed together with water.

The dried gas may be passed through the solution (bubbling) to dehydrate.

The solvent to be mixed with the surfactant is not limited as long as it does not decompose the sulfide solid electrolyte other than water. Specific examples thereof include a nonpolar solvent (apolar solvent). As a nonpolar solvent, a hydrocarbon-based solvent is preferred. As the hydrocarbon-based solvent, saturated hydrocarbons, unsaturated hydrocarbons, or aromatic hydrocarbons can be used.

Examples of the saturated hydrocarbon include hexane, pentane, 2-ethylhexane, heptane, decane, tridecane, cyclohexane, and the like.

Examples of the unsaturated hydrocarbon include hexene, heptene, cyclohexene, and the like.

Examples of the aromatic hydrocarbon include toluene, xylene, ethylbenzene, decalin, 1,2,3,4-tetrahydronaphthalene, and the like.

Among these, toluene or xylene is preferable.

It is preferable that the hydrocarbon-based solvent be previously dehydrated. Specifically, the moisture content is preferably 100 ppm by mass or less, and is particularly preferably 30 ppm by mass or less.

Examples of the sulfide solid electrolyte include sulfide solid electrolytes having a crystal structure such as an argyrodite-type crystal structure, a $Li_3PS_4$ crystal structure, a $Li_4P_2S_6$ crystal structure, a $Li_7P_3S_{11}$ crystal structure, a $Li_{4-x}Ge_{1-x}P_xS_4$-based thio—LISICON Region II type crystal structure, and a crystal structure similar to the $Li_{4-x}Ge_{1-x}P_xS_4$-based thio—LISICON Region II type crystal structure (hereinafter, sometimes abbreviated as an RII type crystal structure). Note that the sulfide solid electrolyte may contain an amorphous component as a part thereof.

In one embodiment, a sulfide solid electrolyte is preferably a sulfide solid electrolyte having an argyrodite-type crystal structure (hereinafter, sometimes referred to as an argyrodite-type solid electrolyte). The argyrodite-type solid electrolyte is not particularly limited. An argyrodite-type crystal structure can be confirmed by having diffraction peaks at 2θ=25.2±0.5 deg and 29.7±0.5 deg in powder X-ray diffraction measurements using CuKα rays. The diffractive peaks are peaks derived from the argyrodite-type crystal structure. Diffractive peaks of the argyrodite-type crystal structure may also appear, for example, at 2θ=15.3±0.5 deg, 17.7±0.5 deg, 31.1±0.5 deg, 44.9±0.5 deg, and 47.7±0.5 deg. The argyrodite-type solid electrolyte may have these peaks.

Examples of the argyrodite-type solid electrolyte may include, for example, solid electrolytes disclosed in WO2015/011937, WO2015/012042, JP2016-24874, WO2016/104702, JP2010-540396, JP2011-096630, and JP2013-211171.

Examples of the compositional formulas include, for example, $Li_6PS_5X$, $Li_{7-x}PS_{6-x}$ (X=Cl, Br, I; x=0.0 to 1.8).

The argyrodite-type solid electrolyte may contain an amorphous component as a part thereof as long as it has X-ray diffraction patterns of the above-mentioned argyrodite-type crystal structure. The amorphous component indicates a halo pattern in which the X-ray diffraction pattern does not indicate peaks other than a peak substantially derived from the raw material in the X-ray diffraction measurement. Moreover, the argyrodite-type solid electrolyte may contain crystal structures other than the argyrodite-type crystal structure, and other raw materials.

In the embodiment, a solid electrolyte is produced by mixing a surfactant, a solvent, and a sulfide solid electrolyte to obtain a mixture; and removing the solvent from the mixture. The mixing order of the surfactant, the solvent and the sulfide solid electrolyte is not particularly limited, and for example, the surfactant and the solvent may be mixed to obtain a surfactant liquid, and then the sulfide solid electrolyte may be mixed into the surfactant liquid. The surfactant, the solvent, and the sulfide solid electrolyte may be mixed simultaneously. Further, the solvent may be added after mixing the surfactant and the sulfide solid electrolyte.

In one embodiment, it is preferable to contain a step of mixing the surfactant and the solvent to obtain a surfactant liquid, a step of mixing the surfactant liquid and the sulfide solid electrolyte to obtain a mixture, and a step of removing the solvent from the mixture. Thus, the surfactant can be uniformly dispersed on the surface of the sulfide solid electrolyte.

The concentration of the surfactant in the surfactant liquid is about 0.1 to 10 gIL per volume of the solvent. Considering the dispersion of the surfactant and the removal of the solvent which is a later step, the concentration is preferably about 0.1 to 1.1 g/L, more preferably 0.3 to 0.9 g/L, and still more preferably 0.5 to 0.7 g/L.

The amount of the surfactant to be mixed with the sulfide solid electrolyte (mg) is preferably 0.01 to 5.0 mg/m$^2$ per specific surface area (m$^2$) of the sulfide solid electrolyte. This allows a suitable amount of surfactant to be coated onto the sulfide solid electrolyte. As a result, it is possible to suppress generation of hydrogen sulfide and to suppress the coarsening of the particle diameter accompanying generation of hydrogen sulfide. The amount of the surfactant to be mixed is preferably 0.03 to 1.0 mg/m$^2$, more preferably 0.05 to 0.5 mg/m$^2$, and still more preferably 0.1 to 0.4 mg/m$^2$.

Note that the specific surface area of the sulfide solid electrolyte is a value measured by the BET method (gas adsorption method), and nitrogen may be used as a gas (nitrogen method), or krypton may be used (krypton method), and is appropriately selected and measured according to the size of the specific surface area. The specific surface area can be measured using, for example, a commercially available apparatus such as a gas adsorption amount measuring apparatus (e.g., AUTOSORB6 (manufactured by Sysmex Corporation)).

As the specific surface area of the sulfide solid electrolyte is larger, the oil absorption is also larger, and therefore, for example, when the specific surface area is 10 m$^3$/g or more, the effect of reducing the oil absorption by mixing the surfactant is large. If the oil absorption can be reduced, the amount of solvent required for slurrying is reduced, and the load in the drying step can be reduced. Further, by increasing the solid content of the slurry, it is possible to increase the thickness of the film, thereby improving the battery performance. Therefore, it is particularly effective when the specific surface area of the sulfide solid electrolyte is large, but it becomes possible to increase productivity when a battery is manufactured using a slurry regardless of the size of the specific surface area.

The method of mixing a surfactant, a solvent and a sulfide solid electrolyte is not particularly limited, and examples thereof include known stirring means, such as a reaction vessel with a stirring blade, a bead mill and a ball mill. The mixing time can be appropriately adjusted depending on the concentration of the surfactant and the stirring apparatus. Normally, the mixing time is about 0.5 to 24 hours.

After the above mixing, the solvent is removed from the mixture. There is no particular limitation on the method of removing the solvent, and a known method can be employed. Examples thereof include vacuum drying. The solvent is removed from the mixture to collect a dry powdery solid electrolyte.

The solid electrolyte produced in the embodiment is capable of suppressing generation of hydrogen sulfide from the sulfide solid electrolyte and also suppressing coarsening of the particle diameter accompanied by generation of hydrogen sulfide, This is presumed to be because, since the surfactant forms a coating on the surface of the sulfide solid electrolyte and the hydrophobic group of the surfactant is directed outward in the coating, the contact of moisture to the sulfide solid electrolyte is suppressed, so that the water resistance is improved.

In addition, it is presumed that the above-mentioned coating suppresses packing (aggregation) between sulfide solid electrolyte particles, and therefore, the dispersibility is also improved.

The solid electrolyte according to one embodiment of the invention contains a sulfide solid electrolyte and a surfactant on the surface of the sulfide solid electrolyte. The amount of the surfactant is 0,01 to 5.0 mg/m$^2$ per specific surface area of the sulfide solid electrolyte. In the solid electrolyte of the embodiment, it is possible to suppress generation of hydrogen sulfide from the sulfide solid electrolyte as described above, and to suppress the coarsening of the particle diameter accompanying generation of hydrogen sulfide. The amount of the surfactant to be mixed is preferably 0.03 to 1.0 mg/m$^2$, more preferably 0.05 to 0.5 mg/m$^2$, and more preferably 0.1 to 0.4 mg/m$^2$.

The amount of the surfactant can be determined by gas chromatography or high-performance liquid chromatography.

The solid electrolyte of the embodiment can be produced by a method of production according to another embodiment of the invention described above.

The volume-based particle diameter (d50) of the solid electrolyte indicates the degree of pulverization of the entire solid electrolyte. The volume-based particle diameter (d95) indicates the presence of coarse particles which cause a short circuit of the battery when the solid electrolyte is used in the battery.

In one embodiment the volume-based particle diameter d50 of the solid electrolyte is preferably 10 μm or less, more preferably 5 μm or less, and still more preferably 2 μm or less. Note that the lower limit is normally about 0.1 μm, In one embodiment, the volume-based particle diameter d95 of the solid electrolyte is preferably 30 μm or less, more preferably 20 μm or less, and still more preferably 15 μm or less. Note that the lower limit is noramlly about 1 μm.

The volume-based particle diameter is determined by a laser diffraction/scattering type particle diameter distribution measurement.

In one embodiment, the ionic conductivity of the solid electrolyte is preferably 0.1 mS/cm or more, more preferably 2 mS/cm or more, and still more preferably 4 mS/cm or more. Note that the upper limit is normally about 20 mS/cm.

EXAMPLES

The present invention is described below in more detail by Examples. Evaluation methods are as follows.
(1) Particle Diameter Distribution of the Solid Electrolyte (Volume-Based Particle Diameter d50 and d95)

A measurement was performed with a laser diffraction/scattering type particle diameter distribution measurement apparatus (LA-950V2 model LA-950W2, manufactured by HORIBA).

A mixture of dehydrated toluene (manufactured by Wako Pure Chemical Industries, Ltd., special grade) and tertiary butyl alcohol (manufactured by Wako Pure Chemical Industries, Ltd., special grade) at a weight ratio of 93.8:6.2 was used as a disperse medium. Into a flow cell of the device, 50 mL of the disperse medium was poured and circulated. Thereafter, a sample to be measured was added to the disperse medium, followed by ultrasonic treatment, and then particle size distribution was measured. The addition amount of the measurement sample was adjusted so that the red-light transmittance (R) corresponding to the particle concentration was 80 to 90% and the blue-light transmittance (B) corresponding to the particle concentration was 70 to 90% on the measurement screen defined by the device. The calculation conditions used were 2.16 as the value of the refractive index of the measurement sample and 1.49 as the value of the refractive index of the disperse medium, respectively. In the setting of the distribution form, the particle size calculation was performed with the fixed number of repetitions to 15 times.

The volume-based particle diameters d50 and d95 were calculated from the particle diameter distribution.
(2) Generation Amount of Hydrogen Sulfide of the Solid Electrolyte FIG. 1 shows a schematic configuration diagram of a test apparatus. The test apparatus 1 includes a flask 10 for humidifying nitrogen, a static mixer 20 for mixing the humidified nitrogen and non-humidified nitrogen, a dew-point meter 30 (M170/DMT152, manufactured by VAISALA CORPORATION) for measuring the moisture in the mixed nitrogen, a double reaction tube 40 in which a measurement sample is installed, a dew-point meter 50 for measuring the moisture in the nitrogen discharged from the double reaction tube 40, and a hydrogen sulfide measuring instrument 60 (Model 3000 RS, manufactured by AMI COMPANY) for measuring the concentration of hydrogen sulfide contained in the discharged nitrogen as the main components, and these components are connected by tubes (not shown). The temperature of the flask 10 is set to 10° C. by the cooling tank 11.

A teflon tube having a diameter of 6 mm was used as the tubes for connecting between the components. In this figure, the tubes are omitted, and the flow of nitrogen is indicated by arrows instead.

The evaluation procedure was as follows.

The evaluation procedure was as follows. In a glove box filled with nitrogen having a dew-point of −80° C., about 1 g of a powdery sample 41 was weighed, and placed inside the double reaction tube 40 so as to be sandwiched between quartz wools 42, and the double reaction tube 40 was sealed. Note that the temperature inside the double reaction tube 40 was held at about room temperature (25° C.).

Nitrogen was supplied into the apparatus 1 from a nitrogen source (not shown) at 0.02 MPa. The supplied nitrogen passes through the biforked branch pipe BP, and a part of the nitrogen is supplied to the flask 10 and is humidified. The others are supplied directly to the static mixer 20 as the non-humidified nitrogen. Note that the amount of nitrogen supplied to the flask 10 is adjusted by means of a needle valve V.

The dew-point is controlled by adjusting the flow rates of the non-humidified nitrogen and the humidified nitrogen with a flow meter FM with a needle valve. Specifically, the non-humidified nitrogen was supplied to the static mixer 20 at a flow rate of 800 ml/min, and the humidified nitrogen was supplied to the same at a flow rate of 10 to 30 mL/min, and both the nitrogen were mixed to confirm the dew-point of the mixed gas (a mixture of the non-humidified nitrogen and the humidified nitrogen) by means of the dew-point meter 30.

After the dew-point was adjusted to −30° C., the three-way cock 43 was rotated to allow the mixed gas to flow through the double reaction tube 40 for 2 hours. The amount of hydrogen sulfide contained in the mixed gas that has passed through the sample 41 was measured by hydrogen sulfide measuring instrument 60, and the amount of hydrogen sulfide generated per 1 g of the solid electrolyte (cc/g) was calculated. The amount of hydrogen sulfide was recorded at intervals of 15 seconds. Further, for reference, the dew-point of the mixed gas after exposure to the sample was measured by means of the dew-point meter 50. The post-measurement nitrogen was passed through an alkaline trap 70 to remove hydrogen sulfide.

(3) Specific Surface Area of the Sulfide Solid Electrolyte

The BET specific surface area was measured by a nitrogen method using a gas adsorption amount measuring apparatus (AUTOSORB6, manufactured by Sysmex Corporation).

(4) Ionic Conductivity Measurement of the Solid Electrolyte

A sample was filled in a tablet molding machine, and a molded body was formed by applying a pressure of 22 MPa to the sample. Carbon was placed on both sides of the molded body as electrodes, and pressure was applied again thereto by a tablet molding machine, whereby a molded body for the measurement (diameter: about 10 mm, thickness: 0.1 to 0.2 cm) was prepared. The ionic conductivity of this molded body was measured by AC impedance measurement. The conductivity value at 25° C. was adopted.

(5) Absorption Mount of Oil

To a mortar, 0.25 g of the solid electrolyte was weighed, and mixed with a spatula while adding toluene dropwise. The addition amount of toluene at a point when the entire powder of the solid electrolyte was slurried and exhibited fluidity by toluene was taken as the absorption amount of oil.

Production Example 1

(1) Production of Lithium Sulfide ($Li_2S$)

As a nonaqueous medium, 303.8 kg of toluene (manufactured by Sumitomo Corporation) which was dehydrated and had a moisture content of 100 ppm when measured by a Karl Fischer moisture meter was added to a 500 L stainless-steel reaction kiln under nitrogen airflow. Then, 33.8 kg of anhydrous lithium hydroxide (manufactured by Honjo Chemical Co., Ltd.) was put in the reaction kiln, and the slurry was kept at 95° C. while being stirred with a twin star stirring blade at 131 rpm.

Hydrogen sulfide (manufactured by Sumitomo Seika Co., Ltd.) was blown into the slurry at a feed rate of 100 L/min, and the temperature was raised to 104° C. An azeotropic gas of water and toluene was continuously discharged from the reaction kiln. This azeotropic gas was condensed by an out-of-system condenser to achieve dehydration. In the meantime, the same amount of toluene as distilling toluene was continuously supplied to the reaction kiln, and the reaction liquid level was maintained in constant.

The moisture content in the condensate gradually decreased, and no distillation of water was observed 24 hours after the introduction of hydrogen sulfide. During the reaction, the reaction liquid was in a state where the solid was dispersed in toluene and stirred, and there was no moisture separated from toluene.

After that, hydrogen sulfide was switched to nitrogen and flowed at 100 L/min for 1 hour.

The obtained solid was collected by filtration and dried to obtain $Li_2S$ as a white powder.

(2) Production of Argyrodite-Type Solid Electrolyte (Sulfide Solid Electrolyte)

(A) Pulverizing Step $Li_2S$ obtained in the above (1) was pulverized under a nitrogen atmosphere using a pin mill (100UPZ, manufactured by Hosokawa Micron Corporation) equipped with a fixed quantity supplier. The input rate was 80 g/min, and the rotation speed of the disc was 18000 rpm.

Similarly, $P_2S_5$, LiBr (manufactured by Honjo Chemical Co, Ltd.) and LiCl (manufactured by Honjo Chemical Co, Ltd.) were respectively pulverized using a pin mill. $P_2S_5$ input rate was 140 g/min, LiBr input rate was 230 g/min, and LiCl input rate was 250 g/min. The rotation speed of each disk was 18000 rpm.

(B) Preparation of Raw Material Mixture

In a nitrogen atmosphere glove box, each compound pulverized in the above (A) was weighed so that the molar ratio was $Li_2S:P_2S_5:LiBr:LiCl$=47.5:12.5:15.0:25.0, and a total amount of the compounds was 110 g. The compounds were put into a glass vessel, and coarsely mixed by shaking the vessel.

110 g of the crude mixed raw material was dispersed in a mixed solvent of 1140 mL of dehydrated toluene (manufactured by Wako Pure Chemical Industries, Ltd.) and 7 mL of dehydrated isobutyronitrile (manufactured by KISHIDA CHEMICAL Co., Ltd.) under a nitrogen atmosphere to obtain a slurry of about 10 wt %. The slurry was mixed and pulverized using a bead mill (LMZ015, manufactured by Ashizawa Finetech Ltd.) while maintaining the slurry under a nitrogen atmosphere. Specifically, 456 g of zirconia beads having a diameter of 0.5 mm were used as the pulverizing medium, and the bead mill was operated under the conditions of a peripheral speed of 12 m/s and a flow rate of 500 mL/min. The slurry was put into the mill and circulated for 1 hour. The treated slurry was placed in a nitrogen-substituted Schlenk bottle, and then dried under reduced pressure to prepare a raw material mixture.

(C) Calcinating Step 30 g of the raw material mixture obtained in the above (B) was dispersed in 300 mL of ethylbenzene (manufactured by Wako Pure Chemical Industries, Ltd.) to obtain a slurry. This slurry was put into an autoclave (capacity: 1000 mL, made of SUS316) equipped with a stirrer and an oil bath for heating, and the slurry was heat-treated at 200° C. for 2 hours while stirring at a rotational speed of 200 rpm. After the treatment, the slurry was dried under a reduced pressure, and the solvent was distilled off to obtain a calcined product.

(D) Firing Step

The calcined product obtained in the above (C) was heated in an electric furnace (F-1404-A, manufactured by Tokyo Garasu Kikai Co., Ltd.) in a nitrogen atmosphere glove box. Specifically, a nagger made of $Al_2O_3$ (999-60S, manufactured by Tokyo Garasu Kikai Co., Ltd.) was placed in the electric furnace, and the temperature was raised from room temperature to 380° C. in 1 hour and held at 380° C. for 1 hour or more. Thereafter, the door of the electric furnace was opened, the calcined product was quickly poured into the sagger, and then the door was immediately closed and heated for 1 hour. Thereafter, the sagger was taken out of the electric furnace and slowly cooled to obtain an argyrodite-type solid electrolyte.

(E) Finely Pulverizing Step

The obtained argyrodite-type solid electrolyte was dispersed in a mixed solvent of dehydrated toluene (manufactured by Wako Pure Chemical Industries, Ltd.) and dehydrated isobutyronitrile (manufactured by KISHIDA CHEMICAL Co., Ltd.) under a nitrogen atmosphere to obtain a slurry of about 8 wt %. The slurry was mixed and pulverized using a bead mill (LMZ015, manufactured by Ashizawa Finetech Ltd.) while maintaining the slurry in a nitrogen atmosphere. The treated slurry was placed in a nitrogen-substituted Schlenk bottle, and then dried under reduced pressure to obtain a finely pulverized argyrodite-type solid electrolyte.

As a result of X-ray diffraction (XRD) measurements, peaks derived from an argyrodite-type crystal structure were observed in the XRD patterns at $2\theta=25.5\pm1.0$ deg and $29.9\pm1.0$ deg, etc.

The specific surface area of argyrodite-type solid electrolyte was 14 $m^2/g$, d50 was 0.6 µm, and d95 was 3.0 µm. Ionic conductivity was 4.6 mS/cm.

Example 1

(1) Preparation of Surfactant (Dehydration)

Neocol (registered trademark) SW-C (manufactured by DKS Co. Ltd.; about 70°% of di(2-ethylhexyl)sulfosuccinate ester (molecular weight: 444.56), 10 to 15% of isopropyl alcohol, and 15 to 20% of water) as a surfactant solution was dehydrated (desolvated) by heating at 100° C. for 5 hours to obtain a dehydrated surfactant. The surfactant solution changed from a highly viscous liquid to a clay-like state.

(2) Production of Solid Electrolyte

Under a nitrogen atmosphere, 0.005 g of the surfactant obtained in above (1) and 10 mL of toluene were put into a 50 mL Schlenk bottle to obtain a surfactant liquid. Next, 1.0 g of the argyrodite-type solid electrolyte of Production Example 1 (specific surface area=14 $m^2/g$) to obtain a mixture. Note that the mixing amount (mg) of the surfactant was set as 0.36 $mg/m^2$ per specific surface area ($m^2$) of the argyrodite-type solid electrolyte. A stirrer tip was put into the mixture and stirred at room temperature for 1 hours while maintaining a nitrogen atmosphere. Thereafter, a dried powder was obtained by removing the solvent by vacuum drying at room temperature for 2 hours. The resulting dry powder was vacuum-dried at 100° C. for 2 hours to obtain a solid electrolyte. The ionic conductivity of the solid electrolyte was 4.8 mS/cm.

Table 1 shows the ionic conductivity, oil absorption, and particle diameter of the solid electrolyte before the test of the generation amount of hydrogen sulfide. The amount of hydrogen sulfide generated and the particle diameter after the test of the generation amount of hydrogen sulfide are shown in Table 1. The number of carbon atoms of the side chains and the number of terminals of the surfactant are shown in Table 2.

TABLE 1

| | before test | | | | after test | | |
|---|---|---|---|---|---|---|---|
| | Ionic conductivity [mS/cm] | Oil absorption [mL] | Particle diameter [µm] | | Generation amount of hydrogen sulfide [cc/g] | Particle diameter [µm] | |
| | | | d50 | d95 | | d50 | d95 |
| Example 1 | 4.8 | 0.20 | 0.3 | 1.7 | 10.8 | 0.8 | 11.6 |
| Example 2 | 2.9 | 0.19 | 0.4 | 2.0 | 8.5 | 0.7 | 2.6 |
| Example 3 | 1.9 | 0.17 | 0.4 | 2.3 | 8.7 | 0.8 | 13.2 |
| Example 4 | 4.5 | 0.23 | 0.3 | 2.3 | 12.0 | 1.3 | 15.2 |
| Example 5 | 4.2 | 0.25 | 0.4 | 5.9 | 12.0 | 2.6 | 44.9 |
| Comp. Ex. 1 | 4.6 | 0.25 | 0.6 | 3.0 | 14.2 | 2.7 | 67.5 |
| Comp. Ex. 2 | 4.0 | — | 1.0 | 7.7 | 13.4 | 2.4 | 10.5 |
| Comp. Ex. 3 | 4.2 | 0.25 | 0.5 | 3.9 | 14.0 | 2.5 | 77.3 |

TABLE 2

| Surfactant | Side chain | |
|---|---|---|
| | Number of carbon atoms | Number of terminals |
| Example 1 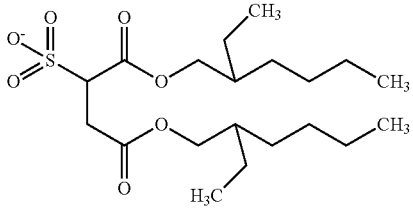 [SMILES: CCCCC(CC)COC(=O)CC(C(=O)OCC(CC)CCCC)S(=O)(=O)[O-]] | 16 | 4 |
| Example 4  SO$_3^-$—(Ph)—C$_{12}$H$_{25}$ | 12 | 1 |
| Example 5  SO$_3^-$—(Ph)—C$_8$H$_{17}$ | 8 | 1 |
| Comp. Ex. 3  NH$_3^+$—C$_8$H$_{17}$ | 8 | 1 |

"Ph" in Table 2 means a benzene ring.

Example 2

The solid electrolyte was produced and evaluated in the same manner as in Example 1, except that the amount of the surfactant was changed to 0.01 g in Example 1(2). The ionic conductivity of the solid electrolyte was 2,9 mS/cm, The results are shown in Table 1.

Example 3

The solid electrolyte was produced and evaluated in the same manner as in Example 1, except that the amount of the surfactant was changed to 0.05 g in Example 1(2). The ionic conductivity of the solid electrolyte was 1.9 mS/cm. The results are shown in Table 1.

Comparative Example 1

The argyrodite-type solid electrolyte of Production Example1 was evaluated. The results are shown in Table 1.

Comparative Example 2

Under a nitrogen atmosphere, 2 g of the argyrodite-type solid electrolyte of Production Example 1, 1 g of fluorine resin-based coating agent (Novec1700, manufactured by 3M Japan Limited), and 5 g of fluorine resin-based liquid (Novec7100, manufactured by 3M Japan Limited) were put into a 50 mL Schlenk bottle and stirred for 1 hour. Then, the solvent was removed by vacuum-drying at room temperature for 1 hour to obtain a solid electrolyte. The ionic conductivity of the solid electrolyte was 4.0 mS/cm. The results are shown in Table 1.

Figure 2:
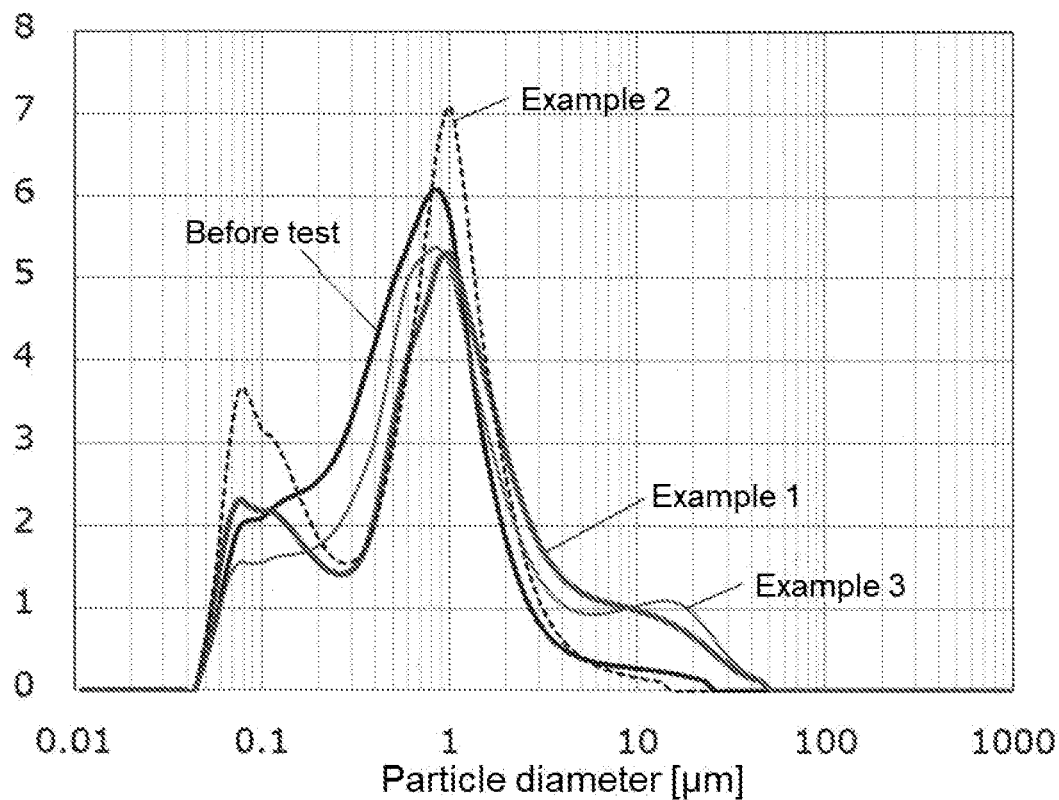
FIG. 2 is a particle diameter distribution before and after the test of the generation amount of hydrogen sulfide from the solid electrolyte of Examples 1 to 3.
Figure 3:
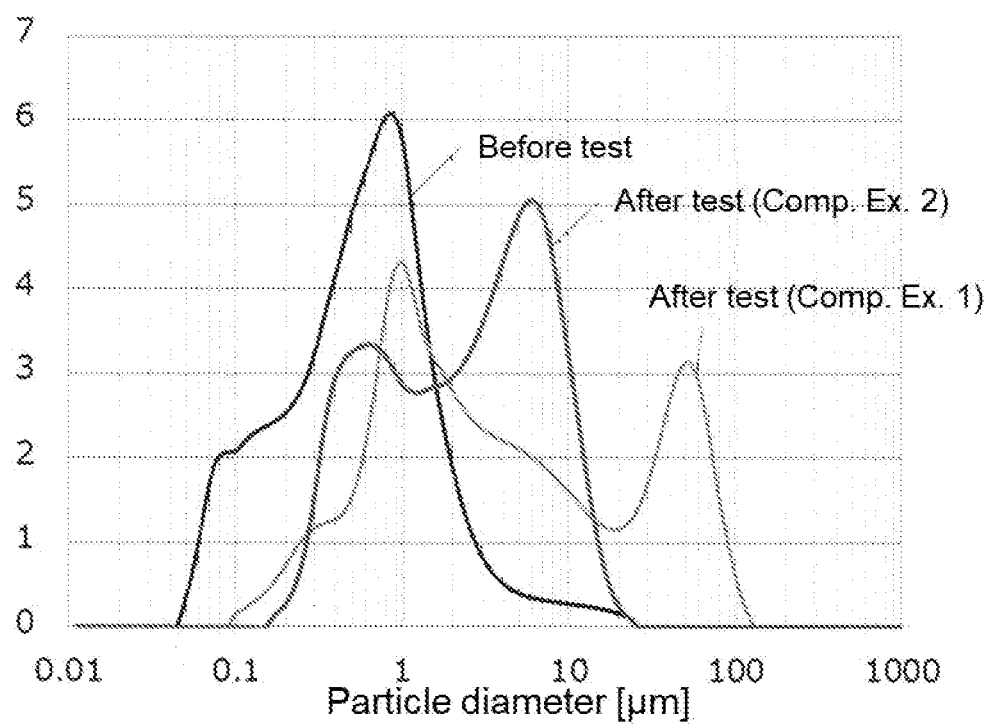
FIG. 3 is a particle diameter distribution before and after the test of the generation amount of hydrogen sulfide from the argyrodite-type solid electrolyte of Production Example 1 (Comparative Example 1), and a particle diameter distribution after the test of the generation amount of hydrogen sulfide from the solid electrolyte of Comparative Example 2.

FIG. 2 shows the particle diameter distribution of the argyrodite-type solid electrolyte of Production Example 1 (before the test of the generation amount of hydrogen sulfide) and the solid electrolyte of Examples 1 to 3 after the test of the generation amount of hydrogen sulfide. FIG. 3 shows the particle diameter distribution before and after the test of the generation amount of hydrogen sulfide of the argyrodite-type solid electrolyte of Production Example 1 (Comparative Example 1) and the particle diameter distribution after the test of the generation amount of hydrogen sulfide of the solid electrolyte of Comparative Example 2. The vertical axis represents the frequency (%), From FIG. 2, it can be confirmed that in the solid electrolyte of Examples, the change in the particle diameter distribution is small before and after the test of the generation amount of hydrogen sulfide. On the other hand, from FIG. 3, it can be confirmed that in Comparative Example 1, a new peak appears in the vicinity of a particle diameter of 50 μm before and after the test of the generation amount of hydrogen sulfide, and the particle diameter distribution largely changes.

As shown in Table 1, d95 is large in Comparative Example 1. d95 indicates the presence of coarse particles affecting short-circuiting, particularly when the solid electrolyte is used in batteries. Larger particle diameters have a major impact on short circuits and battery production. In Comparative Example 2 using fluorine resins, generation of hydrogen sulfide was not suppressed, and d50 was also increased, indicating a tendency of coarsening. In the solid electrolyte of Examples, it can be confirmed that the generation amount of hydrogen sulfide can be suppressed, and furthermore, the coarsening of the particle diameter due to generation of hydrogen sulfide can be suppressed.

Example 4

The solid electrolyte was produced and evaluated in the same manner as in Example 1, except that sodium dodecylbenzenesulfonate (manufactured by FUJIFILM Wako Pure Chemical Corporation) was used as a surfactant in Example 1(2).

The ionic conductivity of the solid electrolyte after coating with the surfactant was 4.5 mS/cm, and the generation amount of hydrogen sulfide was 12 cc/g. Table 2 shows the results of evaluation of the particle diameter after the test of the generation amount of hydrogen sulfide of the solid electrolyte.

Example 5

The solid electrolyte was produced and evaluated in the same manner as in Example 1, except that sodium octylbenzenesulfonate (manufactured by FUJIFILM Wako Pure Chemical Corporation) was used as a surfactant in Example 1(2).

The ionic conductivity of the solid electrolyte after coating with the surfactant was 4.2 mS/cm, and the generation amount of hydrogen sulfide was 12 cc/g. The results are shown in Table 2.

Comparative Example 3

The solid electrolyte was produced and evaluated in the same manner as in Example 1, except that sodium n-octylamine (manufactured by FUJIFILM Wako Pure Chemical Corporation) was used as a surfactant in Example 1(2).

The ionic conductivity of the solid electrolyte after coating with the surfactant was 4.2 mS/cm, and the generation amount of hydrogen sulfide was 14 cc/g. The results are shown in Table 2. The generation amount of hydrogen sulfide was the same as in Comparative Example 1, and there was no reduction effect. It is inferred that the cationic surfactant is localized due to electrostatic repulsion with lithium ions.

For the surfactants shown in Table 2, it is considered that those described above are more lipophilic than those described below. In the solid electrolyte obtained in Example 1, it can be confirmed that the amount of solvent for slurrying the solid electrolyte is small.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A method for producing solid electrolyte particles in the form of a dry powder, comprising:
   mixing an anionic surfactant which is a monomer or an oligomer, a solvent, and a sulfide solid electrolyte to obtain a mixture;
   removing the solvent from the mixture, thereby obtaining dry solid electrolyte particles comprising the anionic surfactant in an amount of 0.01 to 5.0 mg/m² per a specific surface area of the sulfide solid electrolyte, and
   collecting the dry solid electrolyte particles, comprising the anionic surfactant, in the form of a dry powder.

2. The method according to claim 1, wherein the surfactant comprises sulfosuccinate or benzenesulfonate.

3. The method according to claim 1, wherein the surfactant has an alkyl group including 5 or more carbon atoms, and the total number of carbon atoms of the alkyl groups is 5 or more and 20 or less.

4. The method according to claim 1, wherein the number of terminals of alkyl groups in the surfactant is 1 or more and 8 or less.

5. The method according to claim 1, further comprising:
   dehydrating a solution comprising the surfactant and using the dehydrated surfactant.

6. The method according to claim 5, wherein the solution comprising the surfactant comprises a polar solvent, and the solvent comprises a nonpolar solvent.

7. The method according to claim 6, wherein the polar solvent is at least one selected from the group consisting of water and an alcohol.

8. The method according to claim 1, wherein the surfactant does not have a hydroxyl group.

9. The method according to claim 1, wherein the sulfide solid electrolyte has a crystal structure.

10. The method according to claim 1, wherein the sulfide solid electrolyte has an argyrodite-type crystal structure.

11. The method according to claim 1, wherein the amount of the surfactant is 0.1 to 0.4 mg/m² per a specific surface area of the sulfide solid electrolyte.

12. The method according to claim 1, wherein the obtained solid electrolyte particles have a volume-based particle diameter d95 of 1 μm to 30 μm.

13. Solid electrolyte particles in the form of a dry powder, comprising:
   sulfide solid electrolyte particles, and
   an anionic surfactant which is a monomer or an oligomer on the surface of the sulfide solid electrolyte particles,
   wherein an amount of the surfactant is 0.01 to 5.0 mg/m² per a specific surface area of the sulfide solid electrolyte particles.

14. The solid electrolyte particles according to claim 13, wherein the amount of the surfactant is 0.03 to 1.0 mg/m² per a specific surface area of the sulfide solid electrolyte.

15. The solid electrolyte particles according to claim 13, wherein the amount of the surfactant is 0.05 to 0.5 mg/m² per a specific surface area of the sulfide solid electrolyte.

16. The solid electrolyte particles according to claim 13, wherein the amount of the surfactant is 0.1 to 0.4 mg/m² per a specific surface area of the sulfide solid electrolyte.

17. The solid electrolyte particles according to claim 13, having a volume-based particle diameter d95 of 1 μm to 30 μm.

18. The solid electrolyte particles according to claim 13, having a volume-based particle diameter d95 of 1 μm to 20 μm.

19. The solid electrolyte particles according to claim 13, having a volume-based particle diameter d95 of 1 μm to 15 μm.

* * * * *